United States Patent [19]
Weisel et al.

[11] Patent Number: 5,436,945
[45] Date of Patent: Jul. 25, 1995

[54] SHADOW SHIELDING

[75] Inventors: Eric M. Weisel, Windsor Locks; John F. Mullooly, East Hartford, both of Conn.

[73] Assignee: Combustion Engineering, Inc., Windsor, Conn.

[21] Appl. No.: 160,853

[22] Filed: Dec. 3, 1993

[51] Int. Cl.[6] .............................................. G21C 11/00
[52] U.S. Cl. ..................................... 376/287; 376/302
[58] Field of Search ............... 376/260, 287, 288, 302, 376/303, 400, 458, 459

[56] References Cited

U.S. PATENT DOCUMENTS

| | | | |
|---|---|---|---|
| 3,868,302 | 2/1975 | Singleton | 376/287 |
| 4,146,430 | 3/1979 | Berringer | 376/302 |
| 4,731,220 | 3/1988 | Kim, Jr. | 376/287 |
| 4,743,423 | 5/1988 | Turner et al. | 376/287 |
| 4,759,896 | 7/1988 | Boyd | 376/287 |
| 5,116,569 | 5/1992 | Kasahara et al. | 376/900 |

FOREIGN PATENT DOCUMENTS

| | | |
|---|---|---|
| 0152206 | 8/1985 | European Pat. Off. . |
| 0177266 | 4/1986 | European Pat. Off. . |
| 0180187 | 5/1986 | European Pat. Off. . |
| 0212257 | 3/1987 | European Pat. Off. . |
| 0367963 | 5/1990 | European Pat. Off. . |
| 2629737 | 1/1978 | Germany . |
| 60-114789 | 6/1985 | Japan . |
| 163892 | 3/1989 | Japan . |

Primary Examiner—Daniel D. Wasil
Attorney, Agent, or Firm—Ronald P. Kananen; John H. Mullholland

[57] ABSTRACT

Disclosed is a method for reducing embrittlement of certain materials of pressurized water reactor vessels caused by neutron flux. According to this method, "shadow shielding" is placed within the core support barrel in areas having a more benign flow environment than that of the downcomer area. This shadow shielding provides an increased neutron scattering cross section. In one example, the shadow shielding replaces segments of the core shroud plate in a manner which does not interfere with coolant flow in the vessel. The segments of the shroud plate which are replaced are those near critical regions of the vessel, typically welds. The size and shape of the shielding is determined according to plant specific requirements.

14 Claims, 7 Drawing Sheets

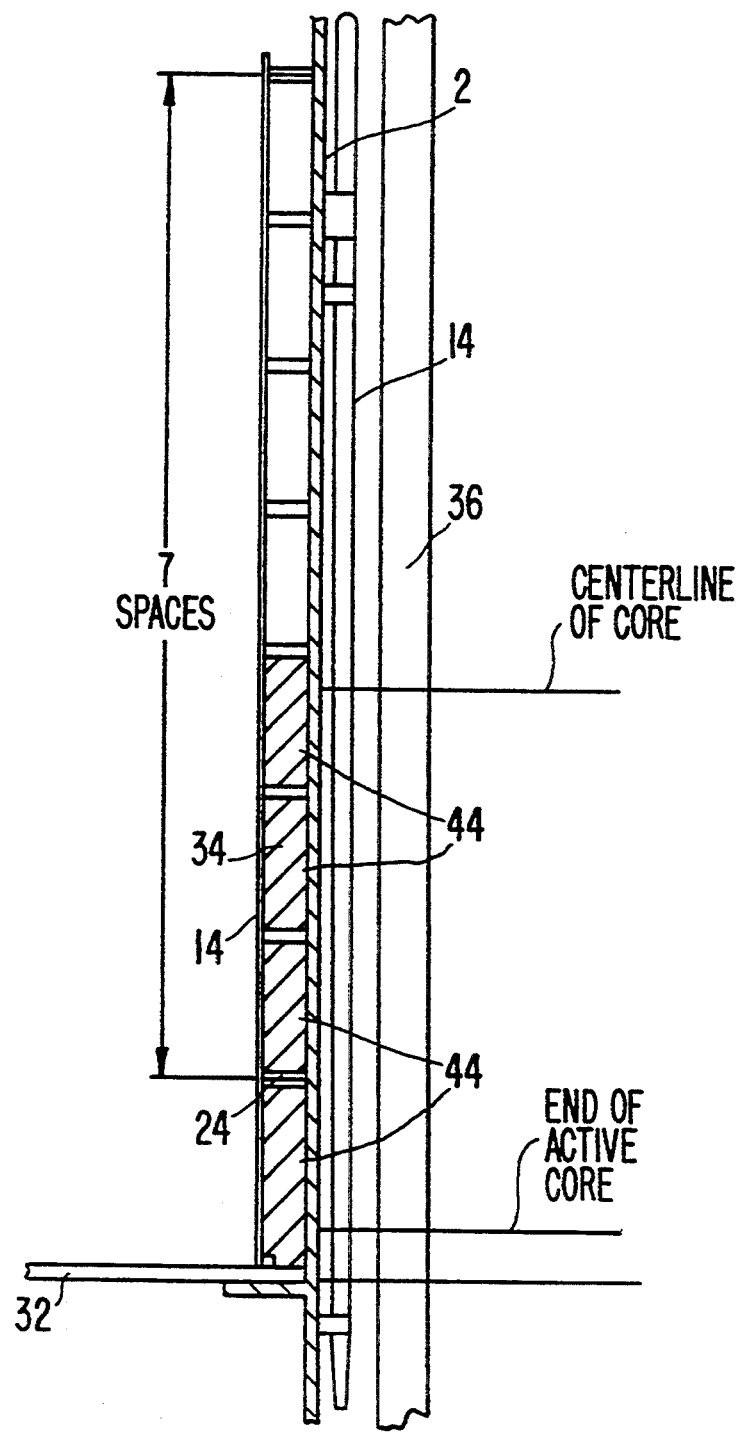

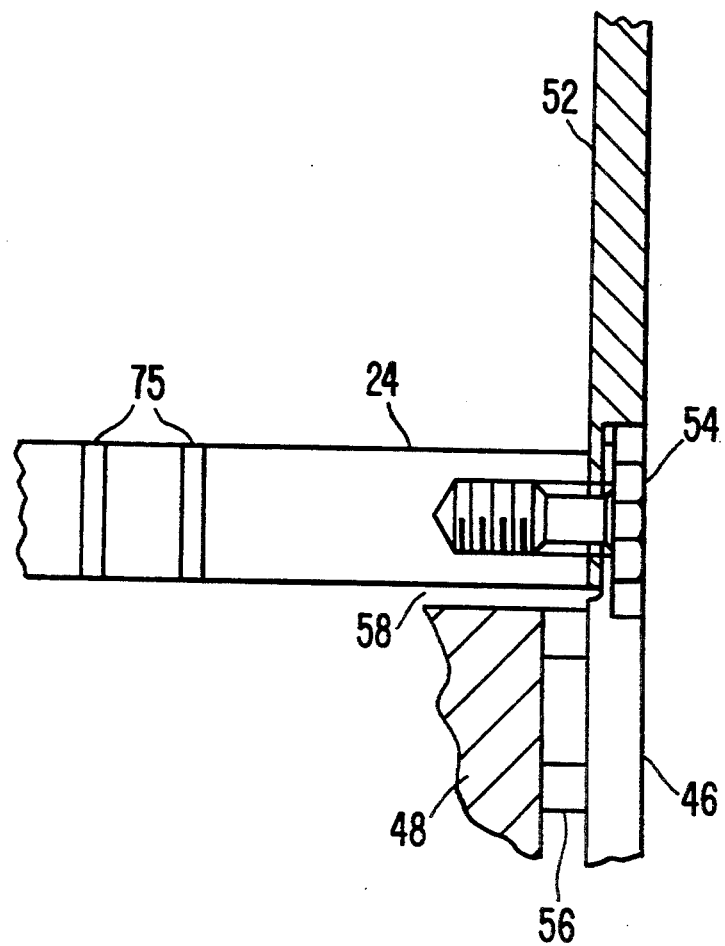

SHADOW SHIELDING

FIELD OF THE INVENTION

This invention generally relates to a method and apparatus for reducing the neutron flux impinging on a nuclear reactor vessel. More specifically, it relates to a novel method and apparatus for shielding local regions of a reactor vessel to reduce neutron flux to critical vessel material.

BACKGROUND OF THE INVENTION

In the nuclear energy industry, a large capital expenditure is required to construct plant facilities. In order to increase the return on this expenditure, it is desirable to operate existing plants at higher power output levels. However, increase in output results in an accompanying increase in neutron flux (fluence) to the reactor vessel (RV) which contributes to embrittlement of RV material.

Such embrittlement increases the hazards posed by pressurized thermal shock (PTS) events. These events are system transients in a pressurized water reactor (PWR) that can cause severe overcooling followed by rapid repressurization. A particularly severe PTS event coupled with a highly embrittled material in the RV beltline could cause a pre-existing flaw to propagate through the vessel wall.

Accordingly, PTS criteria have been mandated which require $RT_{PTS}$ values of 270° F. for plates, forgings and axial weld materials, and of 300° F. for circumferential weld materials used in RVs. These values are to be compared to $RT_{PTS}$ values calculated for each of the beltline materials based on a prescribed margin which accounts for uncertainties and a predicted increase (shift) in the reference temperature. The shift is computed using the best estimate of the copper and nickel content of the material and of the fast neutron fluence for the period of service in question. Thus, it is advantageous to minimize the fast neutron fluence.

According to existing designs, core shroud panels, in conjunction with the core support barrel (CSB), and thermal shield limit neutron fluence to the RV materials. The core shroud assemblies have been designed and constructed in view of structural conditions affecting the various RV structural components, particularly CSB assembly. These conditions include structural integrity, thermal conductivity, hydraulic load level, flow induced vibration, corrosion resistance, thermal loads, thermal shield preload, coolant flow, alignment, distortion, vibration, weight, and stress. Limits for these conditions are established, either directly or indirectly, under current regulations.

While it has been attempted to reduce the fluence to the reactor vessel by introducing extra material outside of the core support barrel, such attempts suffer from several drawbacks. In particular, such designs suffer from placement of extra material in a flow environment in which a severe level of flow induced vibrations is created.

Consequently, there is a need to limit the neutron flux reaching the RV, particularly at critical areas, in a manner which is consistent with current and anticipated design guidelines. In particular, this limiting of the fluence must not substantially interfere with water flow in the vessel and be subject to severe flow induced vibrations. Apart from permitting greater power output, fulfilling this need would permit maintenance of low levels of neutron fluence over extended periods of time at current power output levels, relaxation of current fuel management schemes, and maintenance of an extra margin of security for continuing plant operation in the event the PTS screening criteria becomes more burdensome.

SUMMARY OF THE INVENTION

It is an object of this invention to meet this, and other needs by a method of reducing neutron flux to critical portions of a reactor vessel for a pressurized water reactor (PWR). According to this method, surface areas within the core support barrel of the PWR are located. These surface areas are in the line of sight of neutrons from the core which are incident on the critical portions of the reactor vessel. Shadow shielding is provided at these surface areas so as to substantially reduce the fluence to these critical areas.

It is another object of this invention to provide a method of reducing neutron flux to critical portions of reactor vessels of existing PWRs which have a core support barrel assembly and a core shroud assembly. This method comprises: removing portions of the core shroud located at critical positions in lines of sight of neutrons emitted from the core of the PWR, where the lines of sight extend to the portions of the reactor vessel; and providing shadow shielding panels to the critical positions. According to the invention, the shadow shielding panels provide a substantially greater neutron scattering cross section than the neutron scattering cross section of the removed portions of the core shroud.

According to an aspect of the invention, the critical portions of the reactor vessel include weld points on the reactor vessel.

According to another aspect of the invention, the shadow shielding comprises austenitic stainless steel.

According to another aspect of the invention, the shadow shielding panels are attached to former plates of the core shroud with new former fasteners.

According to yet another aspect of the invention, the core shroud panels are measured with a measuring tool system placed into the core support barrel to obtain surface characteristics, and the shadow shielding plates manufactured according to said surface characteristics.

According to a further aspect of the invention, the shadow shielding comprises a patch portion to be positioned at substantially the same location as a removed core shroud portion and a shield portion attached to a side of said patch portion which faces the core support barrel assembly. The gap is created between the shadow shielding and a core support barrel of the core support assembly, and is large enough to permit reactor coolant to flow therethrough.

According to yet another aspect of the invention cooling holes are drilled into the former plates so that reactor can cool the former plates.

According to still another aspect of the invention, the shadow shield panels are located in a rather benign flow environment such as not to be subject to the severe flow induced vibration as is experienced by shielding positioned in the downcomer between the CSB and the reactor vessel.

BRIEF DESCRIPTION OF THE DRAWINGS

The accompanying drawings, which are incorporated in, and form a part of, the specification, illustrate an embodiment of the present invention and, together with the description, serve to explain the principles of the invention.

In the drawings:

FIG. 5 is an elevation view of a reactor according to an embodiment of the present invention which shows the positioning of a core shroud.

FIG. 7 is a more detailed view of a portion of the reactor shown in FIG. 6.

DETAILED DESCRIPTION OF THE PREFERRED EMBODIMENT

Reference will now be made in detail to the preferred embodiment of the invention, an example of which is illustrated in the accompanying drawings. While a modification of a particular reactor structure according to the instant invention is described, it is to be understood that the invention is not limited to the specific example, but can be applied by those skilled in the art to other reactor arrangements.

Figure 1:
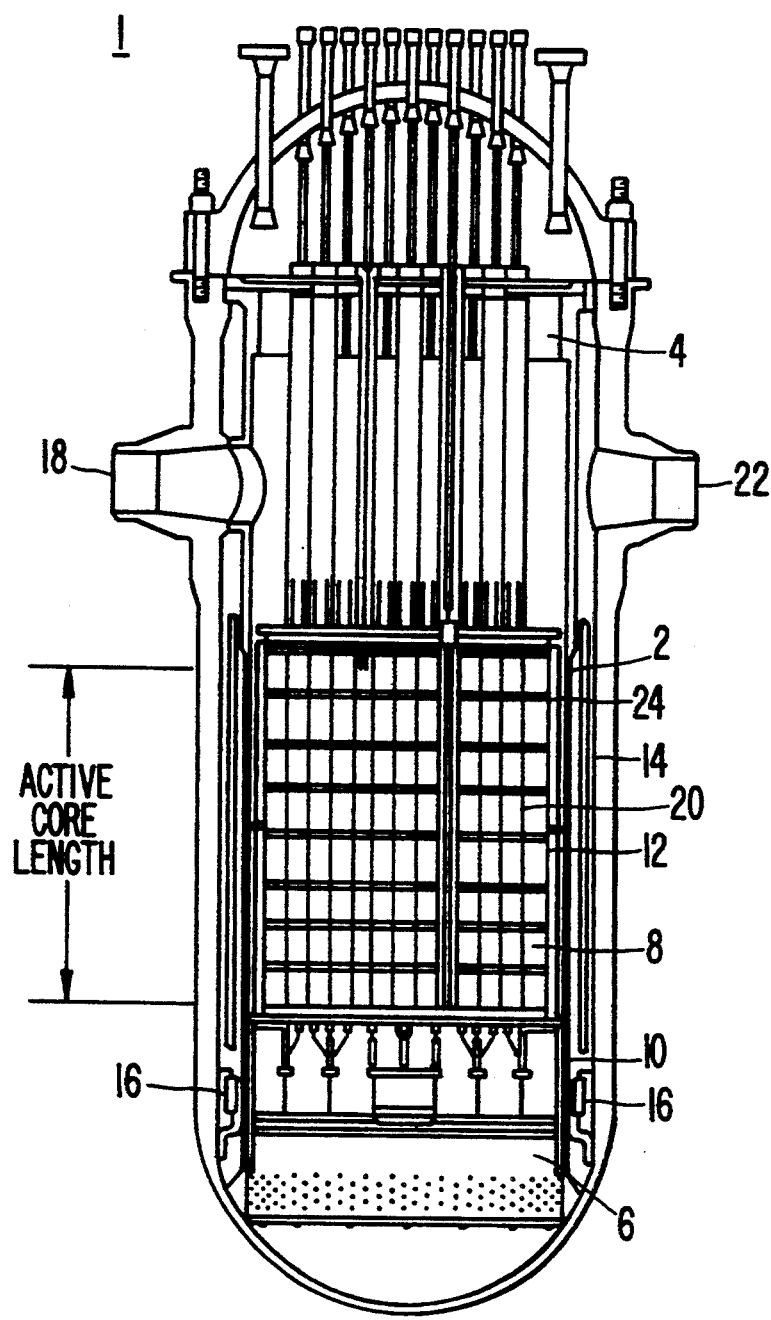
FIG. 1 is an elevated view of the internals of a PWR reactor arrangement.

FIG. 1 illustrates an elevated view of the internals of a reactor arrangement 1 for a PWR. As shown, coolant flows into the reactor core through an inlet nozzle 22 and exits through an outlet nozzle 18. The reactor comprises a core support barrel (CSB) assembly 10, an upper guide structure (UGS) 4, and a flow skirt 6. The CSB assembly 10 includes a core support barrel 2, a core support plate and support columns, a core shroud 12, a thermal shield 14, snubbers 16, and CSB to UGS guide pins. The CSB assembly serves to support and orient the fuel assemblies 20, transmit loads imposed on the CSB 10 to a RV flange, and to provide a passageway for reactor coolant. Typically these components comprise Type 304 stainless steel.

In this example, the core shroud 12 consists of eight sub-assemblies 14A (see FIG. 2) extending in the vertical direction. Each sub-section consists of several vertical rectangular plates held fixedly relative to each other by eight levels of former plates 24 which extend radially from the CSB in a horizontal direction. A plan view of a reactor section and an elevation view showing the positioning of the core shroud 14 within a reactor vessel 36 is provided respectively by FIGS. 2 and 3 in which similar components are indicated with identical reference numbers.

Bolts connect the shroud plates to the former plates 24 thereby forming a sub-assembly which is fastened to the core support plate 32 by the use of anchor blocks. A gap between the outside of the peripheral fuel assemblies and the shroud plates is maintained by the eight levels of former plates 24. The former plates were positioned during initial assembly by adjusting bushings in the core support barrel 2. The overall core shroud assembly 14 (shroud plate to core support plate anchor block, shroud plate to former plate, and former plate to CSB) is a bolted and lock welded assembly. The bolts are designed for shear, bending, and bearing stresses. Holes are provided in the core support plate 32 to allow flow through the annulus 34 between the core shroud 14 and the CSB 2. A gap between the former plates 24 and the CSB 2 allows the flow to move up and through the annulus 34. This arrangement provides cooling of the former and shroud plates.

The shroud provides an envelope to direct coolant flow through the core. It limits coolant flow from bypassing the core by a controlled gap between the outer fuel assemblies and the shroud vertical plates as well as the holes in the core plate that allows flow through the annulus between the CSB and the core shroud. The shroud maintains its envelope under differential thermal expansion and differential pressure.

Figure 2:
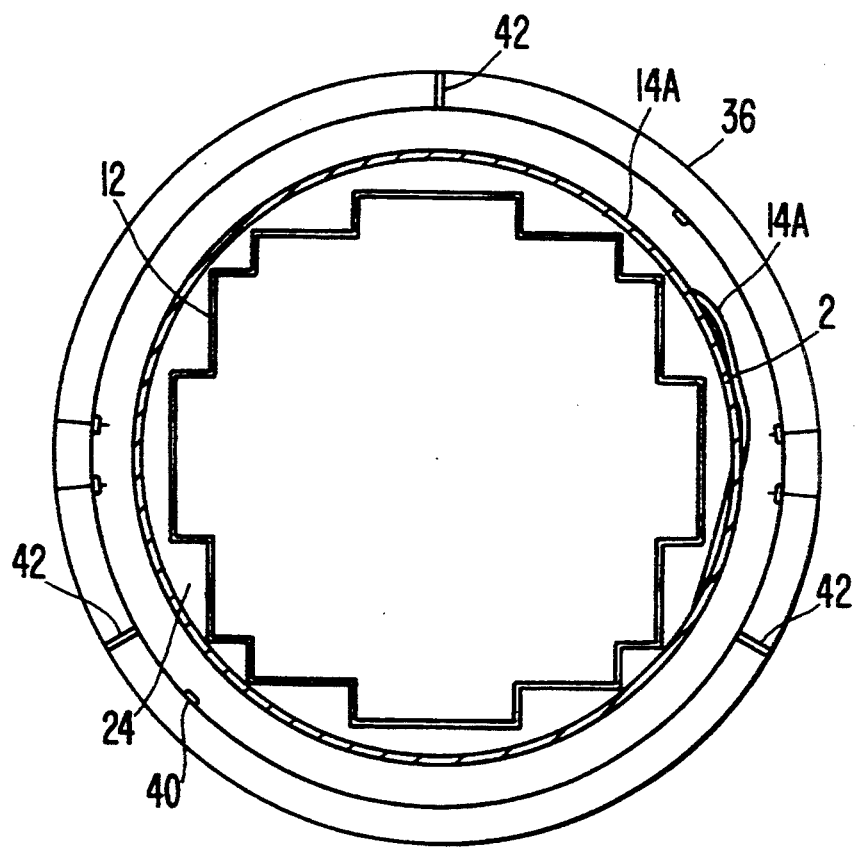
FIG. 2 is a plan view of a reactor section.

FIG. 2 best illustrates three positions corresponding to 60°, 180°, and 300° along the circumference of the RV 36 where points at which critical RV longitudinal welds 42, which are particularly susceptible to neutron flux, are located. While these positions are generally referred to as precise points, it should be understood that the welds extend in both longitudinal and circumferential directions of the RV beyond the specified 60°, 180°, and 300° marks. Due to the configuration of the sub-assemblies as shown, the radial gap formed between the CSB 2 and the side of the shroud plate facing away from the reactor center accordingly varies along the circumference of the CSB 2.

Figure 3:
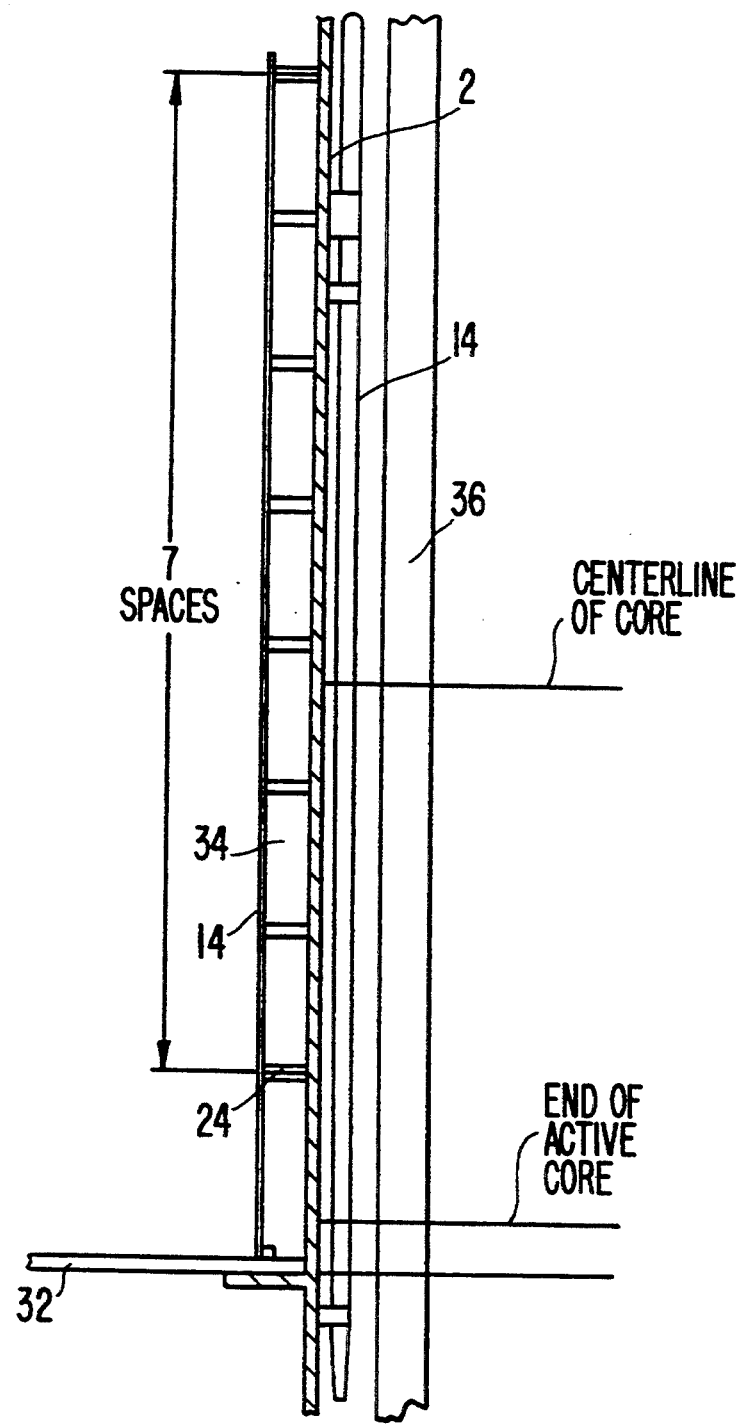
FIG. 3 is an elevation view of a reactor showing the positioning of a core shroud.
Figure 4:
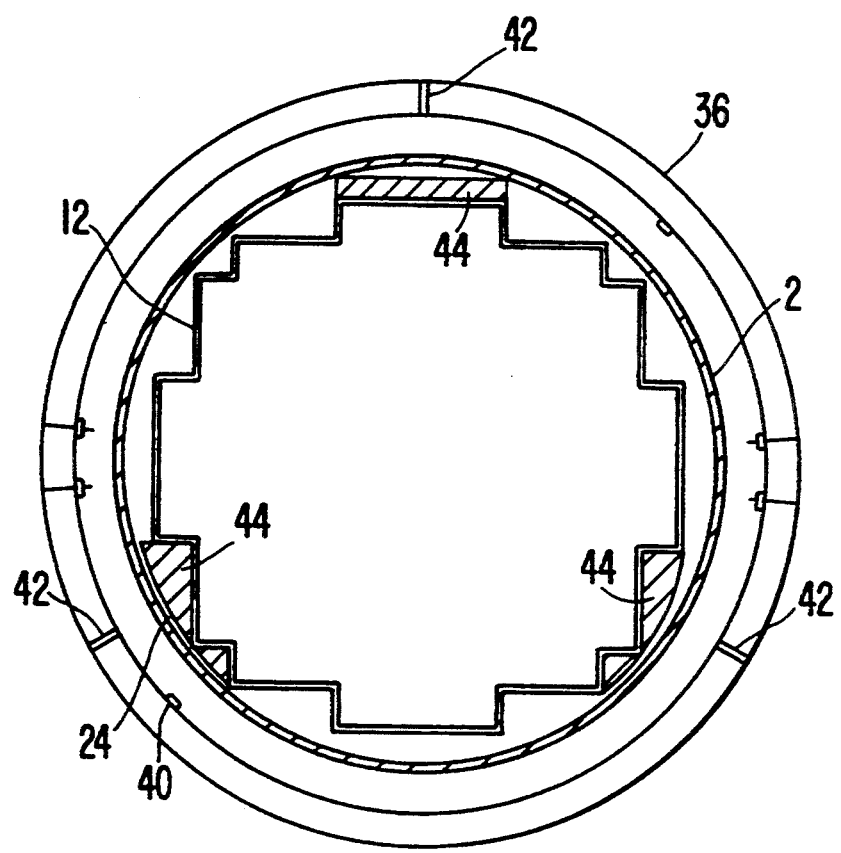
FIG. 4 is a plan view of a reactor section according to an embodiment of the present invention.

FIGS. 4 and 5 show modifications to the example described above with respect to FIGS. 2 and 3 in which longitudinal welds 42 in the lower shell section are shielded from neutron flux by placement of shadow shields in the shaded areas 44 between the shroud plates and the CSB 2 in the above-mentioned gaps. As illustrated, these shaded areas are located within the CSB. Typically, they will be in areas which the shadow shield structure will not be subjected to the severe flow environment as exists, for example, in the downcomer area located between the CSB and the reactor vessel. As a result, flow induced vibrations are minimized.

Figure 6A:
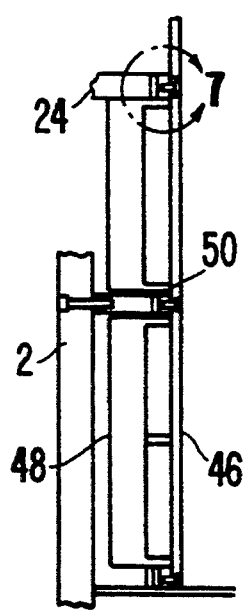
FIG. 6 is a cross-sectional view of a reactor according to an embodiment of the present invention.
Figure 6B:
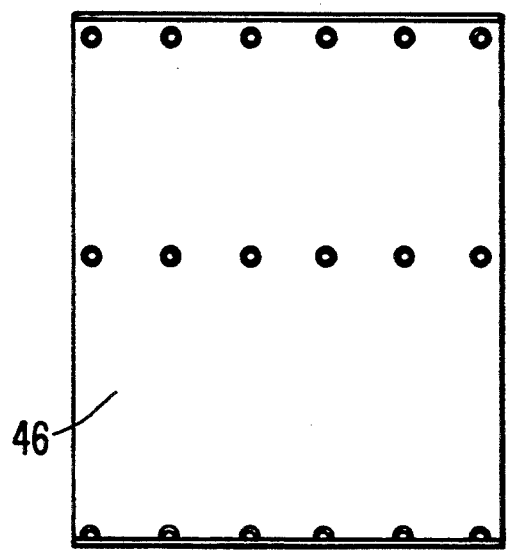
Figure 6C:
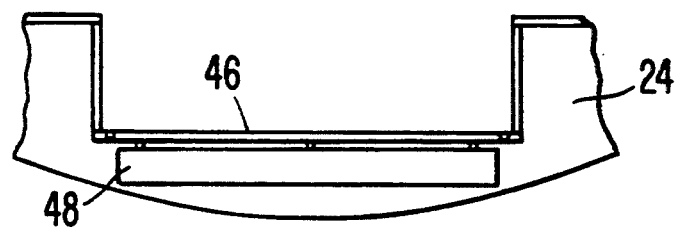

A more detailed description of such a modification according to the invention is provided with reference to FIGS. 6 and 7 which show a PWR wherein sections of existing shroud panels and the associated bolts have been cut out and replaced with a patch panel 46 with integral shielding 48 thereon. The shielding 48 and patch panel 46 are securely held by the same bolted connection method that holds the existing shroud panel, however a new fastener is used. Machining is thereby limited to the local areas of the shielding. Further, the shielding 48 can be customized for the area on which it must fit.

The shadow shielding 48 is designed to attenuate the number of fast neutrons reaching critical axial weld location. According to the invention, the direct line of sight of the fast neutrons coming from the core are blocked. In the example described herein, the shielding only extends above the core support plate up to the third or fourth former plate level (as shown in FIG. 5). Thus, the majority of fast neutrons which provide the greatest contribution to the critical welds are effectively shielded.

As shown in FIG. 7, the shielding is attached to the back side of replacement core shroud panel patches 46. These core shroud panel patches are attached adjacent to an existing shroud plate 52 with a former bolt 54. This allows local areas of core shroud panels to be removed instead of entire panels. The shields are positioned away from the back side of the shroud panel by spacers 56, to allow coolant to flow between the shield and the back side of the shroud panel. Holes 75 are provided in the former plates 24 to facilitate cooling.

Where the shielding approaches the former plates 24, gaps 58 are left between the ends of the shield and the horizontal surface of the former plates 24. These gaps provide clearance for the fit up of the shielding 48. The gaps 58 should be minimized to maintain the effectiveness of the shielding 48, but on the other hand, should be wide enough to insure adequate cooling so maximum temperatures in the structural components of the shroud are not exceeded.

As mentioned above, in this example, the shielding starts just above the core support plate 32 and extends up to the third of fourth former plate elevation. As such, the full length of the axial weld of the PWR shown will not be shielded. The section of the axial weld below the core support plate will not be shielded. As shown in FIG. 3, the active core stops above the core support plate 32. Therefore, the active core height adjacent to the weld will be shielded such that all straight line neutron flux has been shadowed. Shadow shields are not provided for the axial welds below the core support plate because the neutron flux to this area is already minimized by the greater distances the neutrons must travel (through water and metal) as well as the fact that the neutron flux drops off rapidly at the end of the active core.

As the foregoing example illustrates, the invention can be applied to plants having a thermal shield in place. However, as those skilled in the art will appreciate, the invention may also be incorporated in plants without a thermal shield installed.

With regards to the specific composition of the shadow shielding, the principal criteria for selecting materials for the shadow shielding in this example were neutron scattering cross section, physical properties (thermal conductivity, weight), corrosion behavior, fabrication/installation ease, and cost. According to these criteria, it has been found that austenitic stainless steel is a most suitable material for construction of the shadow shielding.

With regards to the specific installation of the shadow shielding, a preferred method in which the basic process steps of the mechanical operations associated with the removal of existing sections of core shroud plate material and installation of replacement shadow shielding plates out of the RV is now set forth. This preferred method comprises performing the following operations under water:

(A) measure and characterize the appropriate core shroud plates as to surface contour profile, and measure and quantify the shroud plate thickness existing at the former plate locations;

(B) machine a dado type cut into the core shroud plate which will accept a corresponding flange on the new shadow shielding panel;

(C) machine lift fixture attachment holes and attach a plate removal fixture to the panel;

(D) utilizing an EDM (electric discharge machining) cutting tool, machine through the remaining thickness of the core shroud plate (an additional EDM tool may be required to square-up corner areas);

(E) install a tool and remove all bolts securing the plate in proper sequence, replacing the bolts with alignment pins at discrete locations;

(F) remove the core shroud plate segment, and machine holes in the former plates and the core shroud;

(G) reinstall the measuring system and confirm that the former plates have not moved;

(H) deliver a new shadow shielding panel and, utilizing an installation tool, install and lock new former bolts in place; and (I) reinstall the measuring system and measure and quantify the surface contour of the, installed shadow shielding panel.

According to this method, the existing core support shroud panels which will be affected by the installation of shadow shielding panels are first measured and characterized. The objective is to obtain the surface contour profile and measure and quantify the plate thicknesses at the former plate locations where shielding is to be installed.

The foregoing is a detailed description of the preferred embodiment. The scope of the invention, however, is not so limited. Various alternatives will be readily apparent to one of ordinary skill in the art. The invention is only limited by the claims appended hereto.

What is claimed is:

1. A method of reducing neutron flux to critical portions of a reactor vessel for a pressurized water reactor (PWR), said PWR including a core support assembly and a core shroud assembly, said method comprising:
    removing portions of the core shroud located at positions in lines of sight of neutrons emitted from the core of said PWR, said lines of sight extending to said critical portions of the reactor vessel; and
    providing shadow shielding panels to said positions, said shadow shielding panels providing a substantially greater neutron scattering cross section than the neutron scattering cross section of the removed portions of the core shroud;
    wherein said positions at which said shadow shielding panels are provided are characterized by a flow environment during operation of the PWR which is subject to less severe flow induced vibration than areas of the PWR located between the reactor vessel and said core support barrel.

2. The method of claim 1 wherein said critical portions of the reactor vessel include weld points on the reactor vessel.

3. The method of claim 1 wherein said shadow shielding comprises austenitic stainless steel.

4. The method of claim 1 wherein said step of providing shadow shielding panels includes fastening said shadow shielding panels to former plates of the core shroud.

5. The method of claim 4 wherein said step of fastening includes installing and locking a new former fastener, said new former fastener attaching said shadow shielding panels to said former plates.

6. The method of claim 5 further comprising the steps of measuring said portions of the core shroud located at critical positions to obtain surface characteristics of said portions of the core shroud, and manufacturing said shadow shielding plates according to said surface characteristics.

7. The method of claim 6 wherein said step of measuring is accomplished with a measuring tool system placed into said PWR core.

8. The method of claim 4 wherein said shadow shielding comprises a patch portion to be positioned at substantially the same location as a removed core shroud portion and a shield portion attached to a side of said patch portion which faces said core support assembly.

9. The method of claim 8 wherein a gap is created between said shadow shielding and a core support barrel of said core support assembly, said gap being large enough to permit reactor coolant to flow therethrough.

10. The method of claim 4 further comprising the step of drilling cooling holes in said former plates whereby said former plates are cooled by reactor coolant.

11. A pressurized water reactor (PWR) comprising:
a core in which a fuel assembly is located, said fuel assembly emitting neutrons therefrom;
a reactor vessel surrounding said core having critical portions which are more susceptible to embrittlement from neutron flux produced by said fuel assembly than other portions of the reactor vessel;
a core support assembly supporting the core of said pressurized water reactor, said core support assembly including a core support barrel surrounded by said reactor vessel;
a core shroud assembly located within said core support barrel; and
shadow shielding panels fixedly attached to portions of the core shroud assembly at positions in lines of sight of neutrons emitted from the PWR core, said lines of sight extending to said critical portions of the reactor vessel, whereby said shadow shielding panels provide a substantially greater neutron scattering cross section at said positions relative to other positions along the core shroud assembly;
wherein said positions at which said shadow shielding panels are attached are characterized by a flow environment during operation of the PWR which is subject to less severe flow induced vibration than areas of the PWR located between the reactor vessel and said core support barrel; and
wherein said shadow shielding panels are attached to said core shroud assembly with former fasteners inserted and locked into former plates of the core shroud.

12. The PWR of claim 11 wherein each said shadow shielding panels comprises a patch portion attached to said former plates and a shield portion attached to a side of said patch portion which faces said core support barrel.

13. The PWR of claim 12 wherein a gap is created between said shadow shielding panels and said core support barrel, said gap being large enough to permit reactor coolant to flow therethrough.

14. The PWR of claim 11 wherein said former plates have cooling holes drilled therein whereby said former plates are cooled by reactor coolant.

* * * * *